US 6,718,315 B1

(12) United States Patent
Meek et al.

(10) Patent No.: US 6,718,315 B1
(45) Date of Patent: Apr. 6, 2004

(54) SYSTEM AND METHOD FOR APPROXIMATING PROBABILITIES USING A DECISION TREE

(75) Inventors: Christopher A. Meek, Kirkland, WA (US); David M. Chickering, Bellevue, WA (US); Jeffrey R. Bernhardt, Woodinville, WA (US); Robert L. Rounthwaite, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 491 days.

(21) Appl. No.: 09/740,067

(22) Filed: Dec. 18, 2000

(51) Int. Cl.[7] .............................................. G06F 15/18
(52) U.S. Cl. ............................. 706/12; 706/14; 706/46
(58) Field of Search ............................ 706/12, 14, 46

(56) References Cited

U.S. PATENT DOCUMENTS

| 5,544,256 A | * | 8/1996 | Brecher et al. ............. 382/149 |
| 6,161,130 A | * | 12/2000 | Horvitz et al. ............. 709/206 |
| 6,408,290 B1 | * | 6/2002 | Thiesson et al. ............ 706/52 |
| 6,505,185 B1 | * | 1/2003 | Chickering .................. 706/55 |

OTHER PUBLICATIONS

Setiono, Rudy, et al. "FERNN: An Algorithm for Fast Extraction of Rules from Neural Networks", Applied Intelligence: The International Journal of Artificial Intelligence, Neural Networks, and Complex Problem–Solving Technologies, vol. 12, No. 1–2, Jan.–Apr. 2000 pp. 1–20.

Tsukimoto, H., "Rule Extraction from Prediction Models", Methodologies for Knowledge Discovery and Data Mining. Third Pacific–Asia Conference, 1999, p. 34–43.

* cited by examiner

Primary Examiner—George B. Davis
Assistant Examiner—Joseph P. Hirl
(74) Attorney, Agent, or Firm—Amin & Turocy, LLP

(57) ABSTRACT

Disclosed is a system for approximating conditional probabilities using an annotated decision tree where predictor values that did not exist in training data for the system are tracked, stored, and referenced to determine if statistical aggregation should be invoked. Further disclosed is a system for storing statistics for deriving a non-leaf probability corresponding to predictor values, and a system for aggregating such statistics to approximate conditional probabilities.

31 Claims, 13 Drawing Sheets

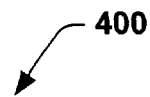

GetTheStats(N)

Input: Decision Tree Node N (Target Variable t)
Set of known variable/value pairs x = { $x_1 = v_1$, $x_2 = v_2$, ... $x_n = v_n$}

Output: statistics for t

```
{
    if ( N is a leaf node)
    {
        return (sstats(N))    // return stored statistics
    }
    else
    {
        let y be the split variable for N
        if ( y is a member of x and the value for y is not in the list of
             predictors with inadequate data, and there is an
             outgoing edge from N corresponding to the value for Y)
        {
            return(GetTheStats(child node corresponding
                               to known value of y)
        }
        else
        {
            s = 0 // generic emptying of statistics
            for each child i of N
            {
                s += sstats(child i) // function
                                      returns stats of a child
            }
        }
    }
}
```

FIG. 11

SYSTEM AND METHOD FOR APPROXIMATING PROBABILITIES USING A DECISION TREE

TECHNICAL FIELD

The present invention generally relates to machine learning techniques and probabilistic reasoning under uncertainty. More particularly, the present invention relates to learning decision trees from data and using learned decision trees to approximate conditional probabilities.

BACKGROUND OF THE INVENTION

Machine learning techniques are a mechanism by which accumulated data can be used for prediction and other analytical purposes. For example, web site browsing data can be used to determine web sites more likely to be viewed by particular types of users. As another example, product purchase data can be employed to determine products a consumer is likely to purchase, based on prior product purchase history and other information.

One type of machine learning technique is decision-tree learning. A decision tree is a structure employed to encode a conditional probability distribution of a target attribute given a set of predictor attributes. For example, the set of predictor attributes may correspond to web sites a user has or has not viewed, or products a user has or has not purchased. The target attribute may then correspond to a web site or product that an analyst is examining to determine whether the user is likely to view or purchase, respectively. Once a decision tree has been constructed, it can be navigated by employing a particular target user's data to determine answers to future viewing or purchasing queries concerning the target user.

A decision tree 10 illustrated in Prior Art FIG. 1 was constructed by a decision-tree learning algorithm for the purpose of predicting a person's salary based on various attributes associated with the person. The learning algorithm constructed the decision tree 10 using a set of training data, where each record in the training data corresponded to a person. The set of known attributes in the training data includes Age, Gender, Job and Salary, where Age is a continuous attribute, Job is a categorical attribute with three states {Engineer, Lawyer, Researcher} and Salary is a categorical (binary) attribute with states {High, Low}. Salary is referred to as the target attribute for the tree because the tree is used to predict Salary. Other attributes employed in building the tree 10 are referred to as predictor attributes.

The decision tree 10 in Prior Art FIG. 1 encodes the conditional probability distribution p(Salary|Age,Gender,Job) learned from the training data. In particular, for assignments of the predictor attributes Age, Gender and Job, the decision tree 10 can be traversed from a root node 12 down to a leaf node 18, a leaf node 20 and/or a leaf node 16. The leaf nodes 18, 20 and 16 store a probability distribution for Salary.

In general, a decision tree is traversed by starting at the root node and following child links until a leaf node is reached. Each non-leaf node is annotated with the name of a predictor attribute to be examined, and each out-going child link from that node is annotated with a value or a set of values for the predictor attribute. Every value of the predictor attribute corresponds to one out-going child link. When the traversal reaches a non-leaf node, the known value of the corresponding predictor attribute is examined, and the appropriate (unique) child link is followed. Non-leaf nodes are referred to as split nodes (or simply splits) in the decision tree. Each split node is annotated with the name of a predictor attribute X, and the node is thus referred to as a split on X. Splits have at least two children. Prior Art FIG. 1 illustrates splits with two children, which create binary trees. It is to be appreciated by one skilled in the art, that although the application describes binary trees, the more general case of non-binary trees can be employed in accordance with the present invention.

To illustrate how to traverse and extract conditional probabilities from a decision tree, consider again the tree 10 in Prior Art FIG. 1. Assume that an analyst desires to predict the salary of a twenty eight year old female engineer. The analyst desires to use the tree 10 to determine p(Salary|Age=28, Gender=female, Job=Engineer). The traversal starts at the root node 12, which is a split on Age. Consequently, the known value of twenty eight for Age is examined and compared to the values on the out-going edges of the root node 12. Because twenty eight is less than thirty, the left child edge is traversed and the traversal moves to a node 14. The node 14 is a split on Job, and because Job=Engineer for the person in question, the traversal moves next to the node 18. The node 18 is a leaf node, and consequently the traversal completes and the conditional probability for Salary can be obtained. In particular, $P(\text{Salary=High}|\text{Age=28, Gender=female, Job=Engineer})=0.65$ $P(\text{Salary=Low}|\text{Age=28, Gender=female, Job=Engineer})=0.35$ Note that the decision tree 10 does not contain any splits on Gender. This means that the learning algorithm identified that Gender was not useful for predicting Salary, at least in the context of knowing Age and Job.

In general, given a decision tree for a probability distribution $p(Y|X_1, \ldots, X_N)$ then for values $x_1, \ldots x_n$ the values $p(Y|X_1=x_1, \ldots X_N=x_n)$ can be extracted by performing the traversal algorithm as described above, and using the distributions stored in the leaf nodes. One skilled in the art will appreciate that $p(Y|X_1, \ldots X_n)$ denotes either a discrete probability distribution or a probability density function, depending on whether Y is a discrete or a continuous attribute, respectively.

There are three problems, using decision trees as described.

A first problem arises because decision trees are constructed using a finite set of data that may not contain very many examples corresponding to a probability later requested from the decision tree. Since the probability distributions at the leaf nodes are estimated from the training data, conventionally it is possible to extract a probability that may not have a reliable estimate due to this "inadequate training data" problem.

Another problem arises when the requested query does not contain a predictor value that may conventionally be employed to traverse a decision tree and thus retrieve a stored probability. This problem typically occurs when not all of the predictor values (e.g., the values of the attributes that define the splits in the decision tree) are provided in a query, yet a conditional probability of the target attribute is still sought. This problem can arise because the conditional probability distribution p(W|X,Y) does not provide adequate information about the probability distribution p(W|X). That is, if the values for one or more predictors are not known, a conventional decision tree may not extract the desired probability. This is known as the missing predictor problem.

A third problem arises because the domain (e.g. the set of possible values) for predictor attributes may not be known when the decision tree is constructed, and these domains may have to be estimated from data. For example, if a decision tree is constructed for p(W|X,Y) using a set of training data, and in that data the attribute X appears in one of two distinct states, the training algorithm is likely to assume that X is a binary attribute. This is problematic if X has more than two states, and the tree is later used to extract p(W|X,Y) for the third value of X. This is known as the "new value" problem.

These three problems can be illustrated in Prior Art FIG. 1. To illustrate the inadequate training data problem, assume that the training data contained no data wherein a lawyer was under thirty. In this case, assume that the split on Job in node 14 was chosen by the learning algorithm because it separates the engineers from the researchers, and this distinction is useful when predicting Salary. By the definition of a split node, Lawyer has to correspond to an out-going edge and the learning algorithm chose to group Lawyers with Researchers. If the tree 10 is used to extract query 22, the probability distribution will be based on Researchers alone, and may not be an accurate distribution for Lawyers.

As another example of the inadequate training data problem, suppose that probabilities are not considered accurate unless at least k records matching the query existed in the training data. Using a conventional decision tree, there is no confidence in the accuracy of the returned probability according to the desired constraint.

The missing predictor problem is illustrated in FIG. 1 by considering an attempt to extract the probability p(Salary|Job=Engineer). That is, the value for the Age predictor is unknown. A conventional decision tree 10 is unable to provide the desired probability because it is not known to which child of the root node 12 the traversal should follow to reach a leaf node.

The new value problem is illustrated in FIG. 1 by considering the query p(Salary|Age<30, Job=Carpenter). Because the learning algorithm assumed that the values of Job were {Engineer, Lawyer, Researcher} when the tree was built, a conventional decision tree cannot be traversed using the given query because there is no out-going edge from node 14 corresponding to Carpenter, and consequently no conditional probability can be returned.

In light of the above problems associated with decision trees, the inadequate training data, the missing predictor, and the new value problems, the usefulness of conventional decision trees are limited. Thus, there is a need for a system and method to build and analyze decision trees so that the problems described above are mitigated.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention provides a system and method for using a decision tree to approximate a conditional probability in either (1) the inadequate training data, (2) the missing predictor, or (3) the new value problem situations. The invention concerns both learning decision trees from data and using the resulting trees to answer queries.

When a decision-tree learning algorithm constructs a tree from training data, it uses counts from the data, known as sufficient statistics, to calculate probabilities within leaf nodes. Conventionally, these statistics are discarded, while the present invention stores such sufficient statistics explicitly in the leaf nodes to facilitate deriving conditional probabilities for problematic queries. The present invention recognizes when such problematic queries occur, aggregates the sufficient statistics contained within a subset of the leaf nodes below a problematic split node, and uses the aggregated statistics to derive an appropriate approximate probability.

The present invention may include a data structure wherein statistics used to generate stored probabilities are not discarded, and are made available to an aggregation algorithm that approximates the probabilities. The aggregating algorithm may utilize the stored statistics to approximate a probability distribution in either of the three problem situations described above. Since such aggregating techniques may not be required for all queries, a program predicting conditional probabilities by analyzing a decision tree may include a component for detecting when aggregation should occur. Further, a component for determining which of the inadequate training, missing predictor, and/or new value problem situations has triggered the need to aggregate may be included. Different aggregation algorithms may be applied, based, at least in part, on the determination of which problem triggered the need to aggregate. Thus, the problems concerning the three situations described above are mitigated and the usefulness of decision trees in computing conditional probabilities is improved.

The invention implements an aggregation method operable to approximate queries in problematic situations. The aggregation method collects a set of sufficient statistics for nodes below a problematic internal node a decision tree to facilitate approximating a desired probability. In one example aspect of the present invention, when a split node is encountered during a query-driven traversal of the tree that triggers at least one of the inadequate training data, missing predictor and/or new value problems, the sufficient statistics for all nodes below the triggering split node can be aggregated, facilitating producing a desired, yet conventionally unproducable probability. This aggregation technique can be referred to as the "simple aggregation" method.

It is to be appreciated by one skilled in the art that the sufficient statistics collected by such an aggregation method are identical to the sufficient statistics that would correspond to the problematic split node if the decision tree learning algorithm had stopped partitioning the data at the triggering split node, in which case the triggering split node would have been a leaf node. The "simple aggregation" method can be enhanced by caching aggregate statistics corresponding to (internal) split nodes in the split nodes themselves, which facilitates retrieving such aggregation statistics. With the aggregation statistics cached, probabilities can be pre-computed and stored in the (internal) split nodes, eliminating the need to re-derive probabilities, facilitating efficiently retrieving probabilities.

An alternative aspect of the present invention provides the "consistent look-ahead aggregation" method to restrict the sufficient statistics that are included in the aggregation to those statistics that are consistent with a given query. For example, while a query may be missing a predictor value at a trigger node, rather than aggregating all the sufficient statistics for nodes below the trigger node, only nodes consistent with the known conditions in the query may be included in the harvest of sufficient statistics that are aggregated to produce the desired probability. For example, referring to FIG. 1 and Query 24, the sufficient statistics from node 20 would not be included in the aggregation triggered at the root node 12 because the query specifies that Job=Engineer.

Although two aggregating methods, the simple and the consistent look-ahead methods, are described herein, it is to be appreciated by one skilled in the art that the present invention is not intended to be limited to these two aggregation methods, and that other aggregation methods may be employed in connection with the present invention.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 11 is a segment of pseudocode for a recursive algorithm for retrieving the statistics sufficient to perform the aggregation method.

DETAILED DESCRIPTION OF THE INVENTION

Figure 1:
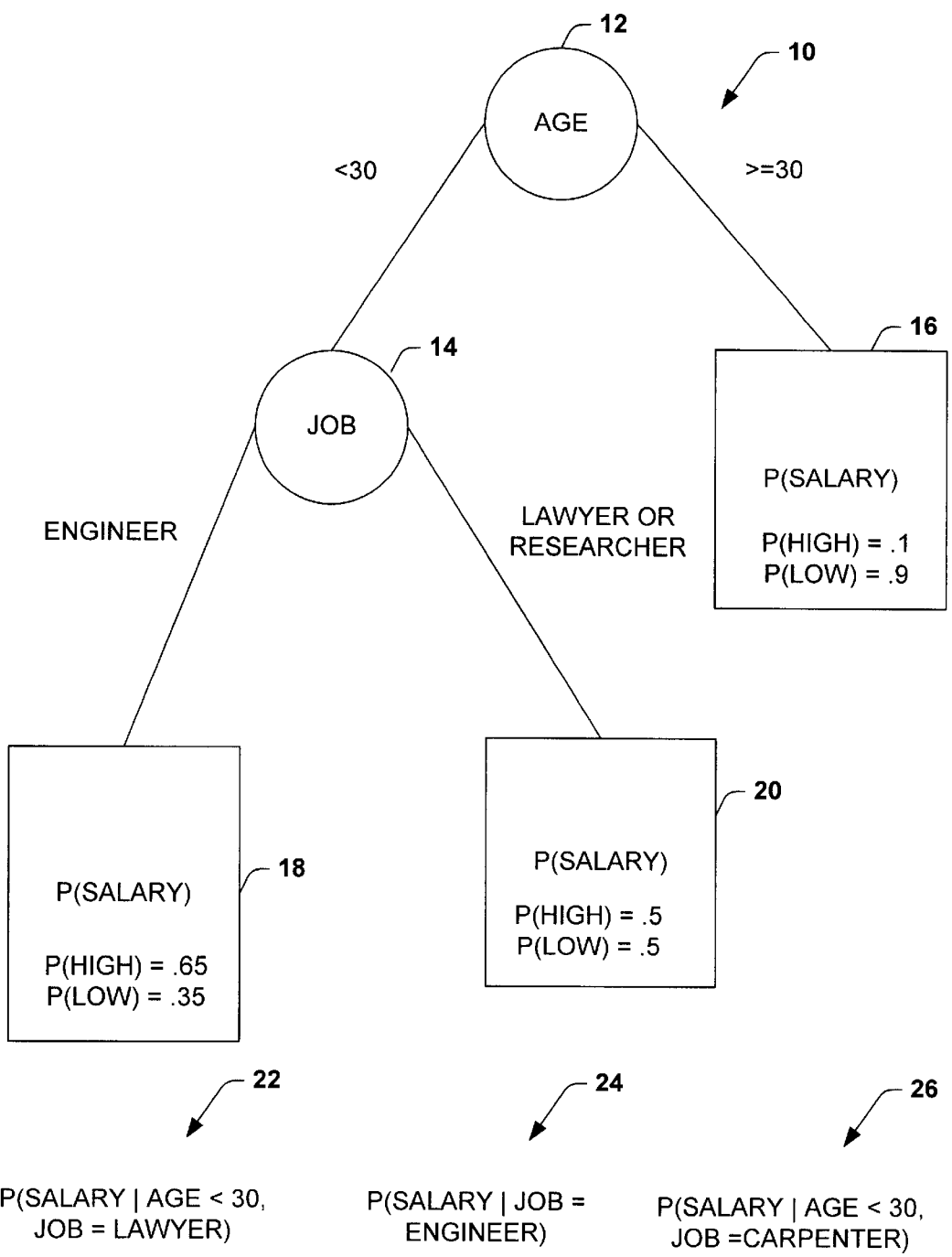
FIG. 1 is a prior art tree diagram illustrating a conventional decision tree.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. In other instances, well-known structures and devices are shown in block diagram form in order to facilitate description of the present invention.

As used in this application the phrase "relevant training cases" for a split node S (RTC(S)) denotes the set of instances in the training data with values consistent with the split values on the path from the root to the split node S. For example, in Prior Art FIG. 1, RTC(node 14) denotes the set of training cases for which Age<30. Note that the relevant training cases for a root node is the set of all training cases.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program and a computer. By way of illustration, both an application running on a server and the server can be components.

Figure 3:
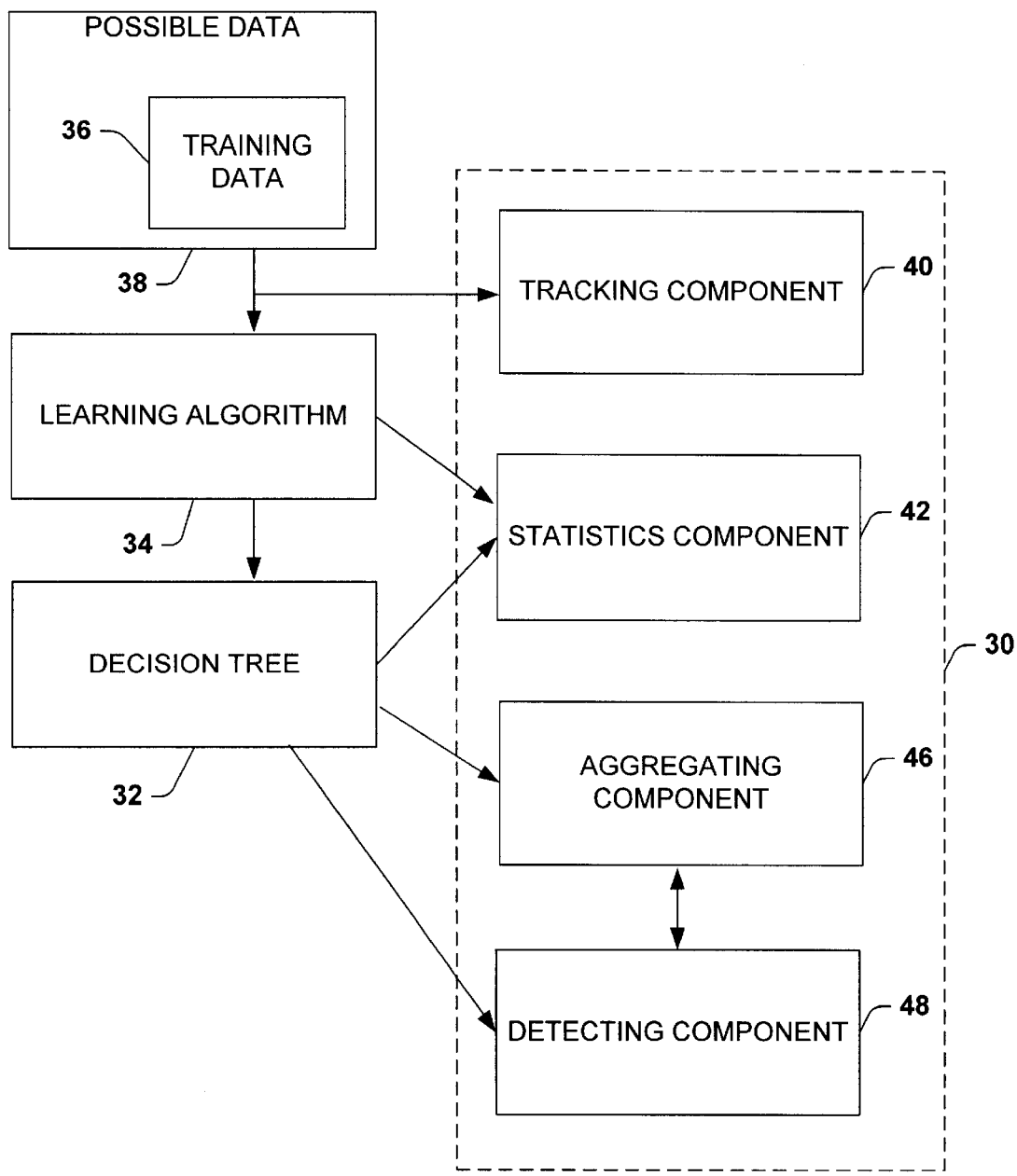
FIG. 3 is a schematic block diagram illustrating a system for extracting predictions from a decision tree in accordance with an aspect of the present invention.

FIG. 3 is a schematic block diagram illustrating a system 30 for extracting predictions from a decision tree 32. The decision tree 32 is constructed by a learning algorithm 34 that examines a set of training data 36, which is a subset of the possible data 38. It is to be understood by one skilled in the art that any of the well-known learning algorithms for constructing decision trees may be utilized to construct the decision tree 32.

The system 30 extracts predictions from the decision tree 32 and may include a tracking component 40. The tracking component 40 monitors data from the training data 36 as it is transmitted to the learning algorithm 34, and may keep a list of splits made in constructing the decision tree 32. In addition, the tracking component 40 may keep a list, for each split, of predictor values not encountered at least a certain number of times within the relevant training cases for that split. Thus, the tracking component 40 compiles information that mitigates the inadequate data problem described above. The list of predictor values not encountered at least a certain number of times in the relevant training cases for a split may be stored in the split nodes, as will be described in FIG. 4. The tracking component may contain a threshold value k, which may be zero, for each predictor value, such that the list of predictor values will contain values that do no occur in at least k cases. If the predictor value does not occur in at least k cases, it is treated as though it did not occur in the data for the split.

The system 30 may also include a statistics component 42 that monitors the learning algorithm 34 processes that determine the probabilities for the leaf nodes in the decision tree 32. When the learning algorithm 34 completes the decision tree 32, the statistics component 42 may store in the leaf nodes of the decision tree 32 the information and statistics used in generating the probabilities stored in the leaf nodes. For example, for a binary target attribute (e.g. Salary), the learning algorithm may count the number of occurrences of both states of that attribute. For example, in FIG. 1, component 42 would store, for each leaf the corresponding number of cases where Salary=high and Salary=low). It is to be understood by one skilled in the art that different types of leaf distributions for the target attribute (e.g. binomial distributions for binary attributes, Gaussian distributions for continuous attributes) may have other statistics for determining the probabilities stored in the leaf nodes.

An aggregating component 46 may also be included in the system 30 to generate approximate probabilities for conditional probability queries. For example, as noted in the discussion of prior art FIG. 1, a possible query for the decision tree 10 (FIG. 1) may be to predict the conditional probability of a high salary given Age<thirty and Job=lawyer. But, as noted above, if there were no lawyers under the age of thirty in RTC(node 14), then the resulting conditional probability may be inaccurate and/or irrelevant. The aggregating component 46 may collect statistics and perform calculations to produce an approximation (examples of which are discussed below) to mitigate the inadequate data problem as described above, as well as the other two problems discussed. The aggregating component 46 may access the statistics generated by the statistics component 42 when performing the aggregating function. Representative examples of the operation of the aggregating component 46 will be described in more detail below.

A detecting component 48 may be included to determine when the aggregating component 46 should perform its aggregating function and when the requested conditional probability may be retrieved from a leaf in the decision tree 32. The detecting component 48 thus may determine that any combination of the (1) missing predictor, (2) inadequate training data, and (3) new value problems described above are present for a query presented to the decision tree 32. For example, one method the detecting component 48 may employ in detecting the inadequate data problem may be to examine the information generated by the tracking component 40 that was tracking predictor values for split nodes in the decision tree 32 that did not occur in the relevant training data for each of those split nodes. When a query arrives requesting the conditional probability based on a predictor whose value did not appear in the training data, the detecting component 48 may trigger the aggregating functionality of the aggregating component 46. Examples of such detection and the resulting aggregation are provided below.

Figure 4A:
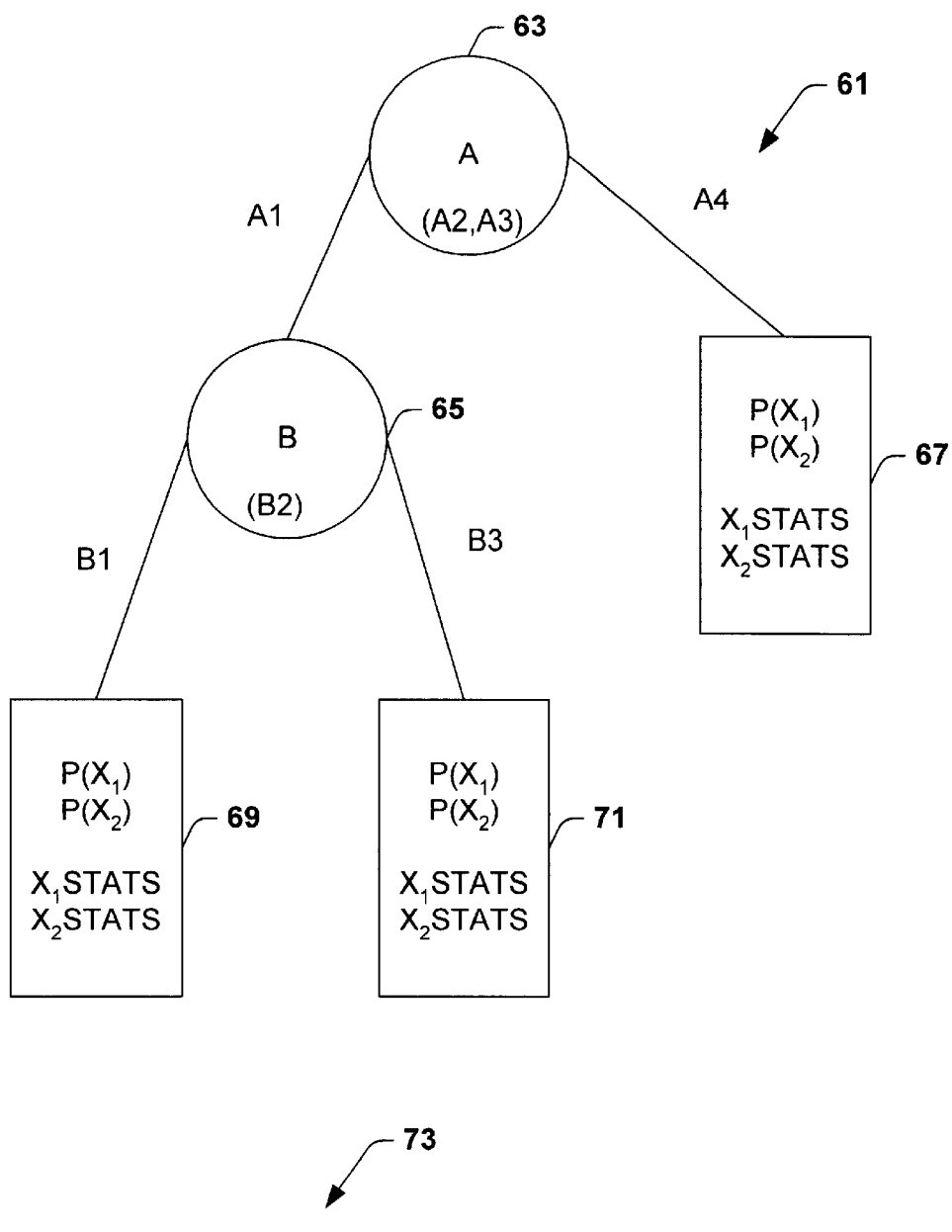
FIG. 4A is a tree diagram illustrating an annotated decision tree in accordance with an aspect of the present invention.

FIG. 4A is a tree diagram illustrating a decision tree 61 annotated in accordance with an aspect of the present invention. While the decision tree 61 may have similar splits and probabilities as the decision tree 60 illustrated in FIG. 2, the decision tree 61 provides additional data stored in each of the nodes 63, 65, 67, 69, and 71. For example, statistics used in generating the probabilities stored in the nodes 63, 65, 67, 69, and 71 may be stored in those nodes respectively. The decision tree 61 may include a root node 63, upon which a split on attribute A was made. The root node 63 may include a list of predictor values not encountered at least k times for the attribute A in the training data (illustrated as a bracketed list (A2,A3) inside the root node 63). The list of predictor values not encountered in the training data at least k times may have been produced by the tracking component 40 (FIG. 3) as the training data 36 was transmitted to the learning algorithm 34. The list of predictor values not encountered at least k times in the training data may be utilized by the detecting component 48 (FIG. 3) to determine when the aggregating component 46 should produce an approximation.

The left child 65 of the root node 63 may indicate that a split on attribute B was made during the learning process. The left child 65 may include a list of predictor values not encountered in RTC(node 65) during training (e.g. B2). The right child 67 of the root node 63 may include, in addition to the probability that x will be in a certain state, statistics for determining how the probability was computed.

Similarly, the left child 69 and the right child 71 of split node 65 may contain both probabilities and statistics to determine how probabilities were computed. A query 73 may seek a conditional probability for x given A and B. Unlike the conventional decision tree 60 in FIG. 2, the decision tree 61 may produce an approximate probability based on the additional information stored in the leaf nodes 69 and 71. For example, when the detection component 48 (FIG. 3) determines that the query 73 may not be processed by reading a probability from a leaf node, it may trigger (e.g. set a flag, send a signal, generate an interrupt) the aggregating component 46 (FIG. 3) to perform its aggregating function. The aggregating component 46 (FIG. 3) may then determine the approximate probability that x will be in state x=1 by, for example, performing an aggregating function utilizing stored counts of x=1 and x=2 from multiple leaf nodes in the tree, thereby mitigating the three problems described above.

Figure 4B:
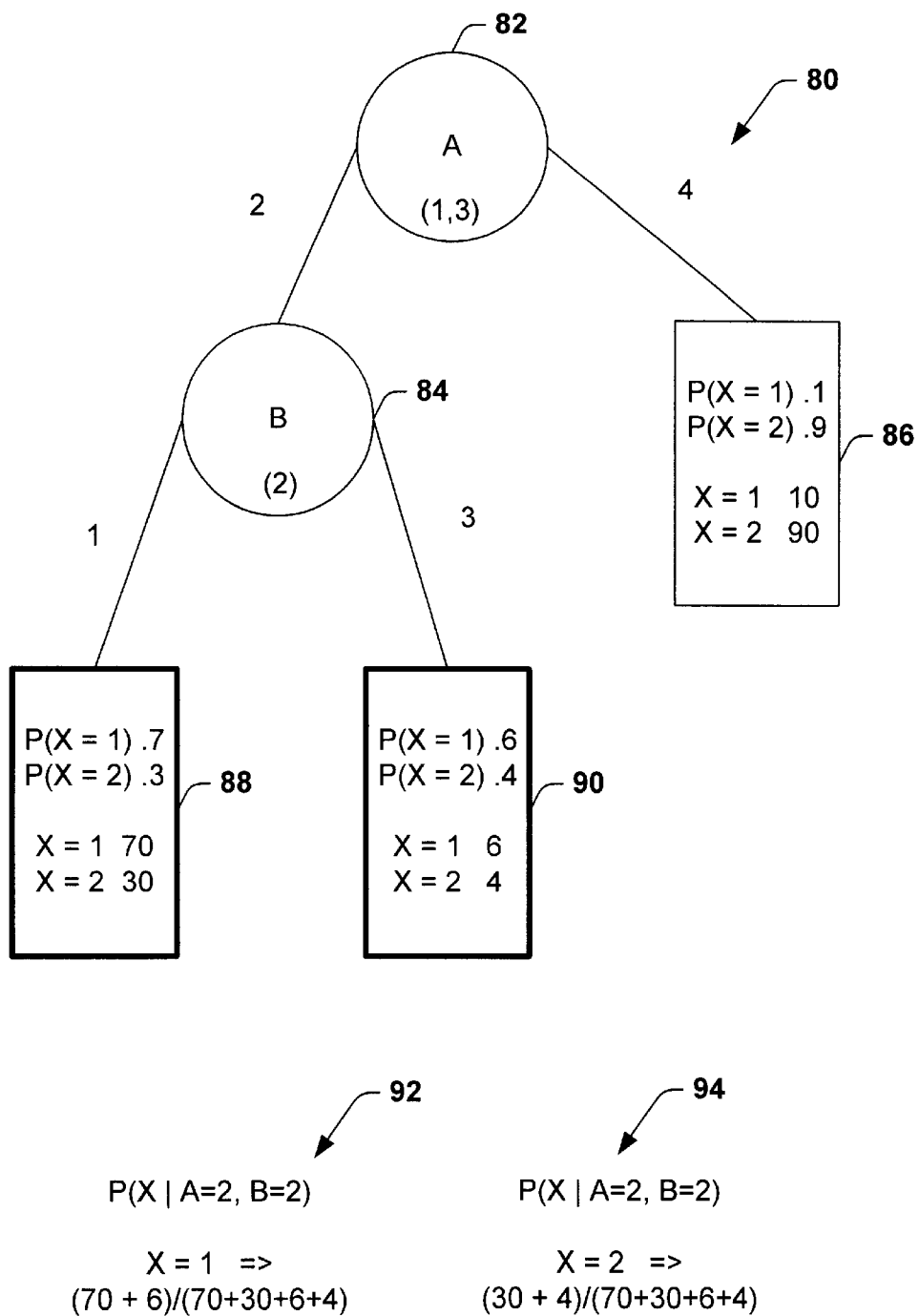
FIG. 4B is a tree diagram illustrating an annotated decision tree in accordance with an aspect of the present invention.

FIG. 4B is a tree diagram illustrating a decision tree 80 annotated in accordance with an aspect of the present invention. While the decision tree 80 may have similar splits and probabilities as the decision tree 60 illustrated in FIG. 2, the decision tree 80 provides additional data stored in each of the nodes 82, 84, 86, 88 and 90. For example, statistics used in generating the probabilities stored in the nodes 86, 88 and 90 may be stored in those nodes respectively. The decision tree 80 may include a root node 82, which includes a list of predictor values that are not encountered at least a threshold number of times in the training data (illustrated as a bracketed list (1,3) inside the root node 82). The list of predictor values not encountered at least a threshold number of times in the training data may have been produced by the tracking component 40 (FIG. 3) as the training data 36 was transmitted to the learning algorithm 34. The list of predictor values not encountered at least a threshold number of times in the training data may be utilized by the detecting component 48 (FIG. 3) to determine when the aggregating component 46 should produce an approximation. For example, the detecting component 48 (FIG. 3) may determine that an inadequate training data problem exists or that a missing predictor data problem exists by comparing the predictor values provided in a query against the list of sparse predictor values and/or stored splits. The detecting component 48 may determine that a new value problem exists if a provided predictor value matches neither (1) the values corresponding to the child nodes nor (2) the set of predictor values that had no data. Alternatively, the detecting component 48 may keep an external list of the known states for each predictor, and will recognize when a new value is provided by comparing to the list.

The left child 84 of the root node 82 may include a list of predictor values not encountered at least a threshold number of times within RTC(node 84) during training (e.g. 2). The right child 86 of the root node 82 may include, in addition to the probability that x will be in a certain state, statistics for determining how the probability was computed. For example, in leaf 86, the probability that x=1 may be computed to be 0.1, determined by dividing 10 by 100, wherein 10 was the number of times x=1 and 100 is the sum of 10+90, the counts of when x=1 and x=2 respectively, as encountered in the training data. It is to be appreciated by one skilled in the art that there are alternative ways of determining probabilities from the counts in this example, and that for probability distributions other than the binomial distribution, other statistics may be employed to compute these probability distributions.

Figure 2:
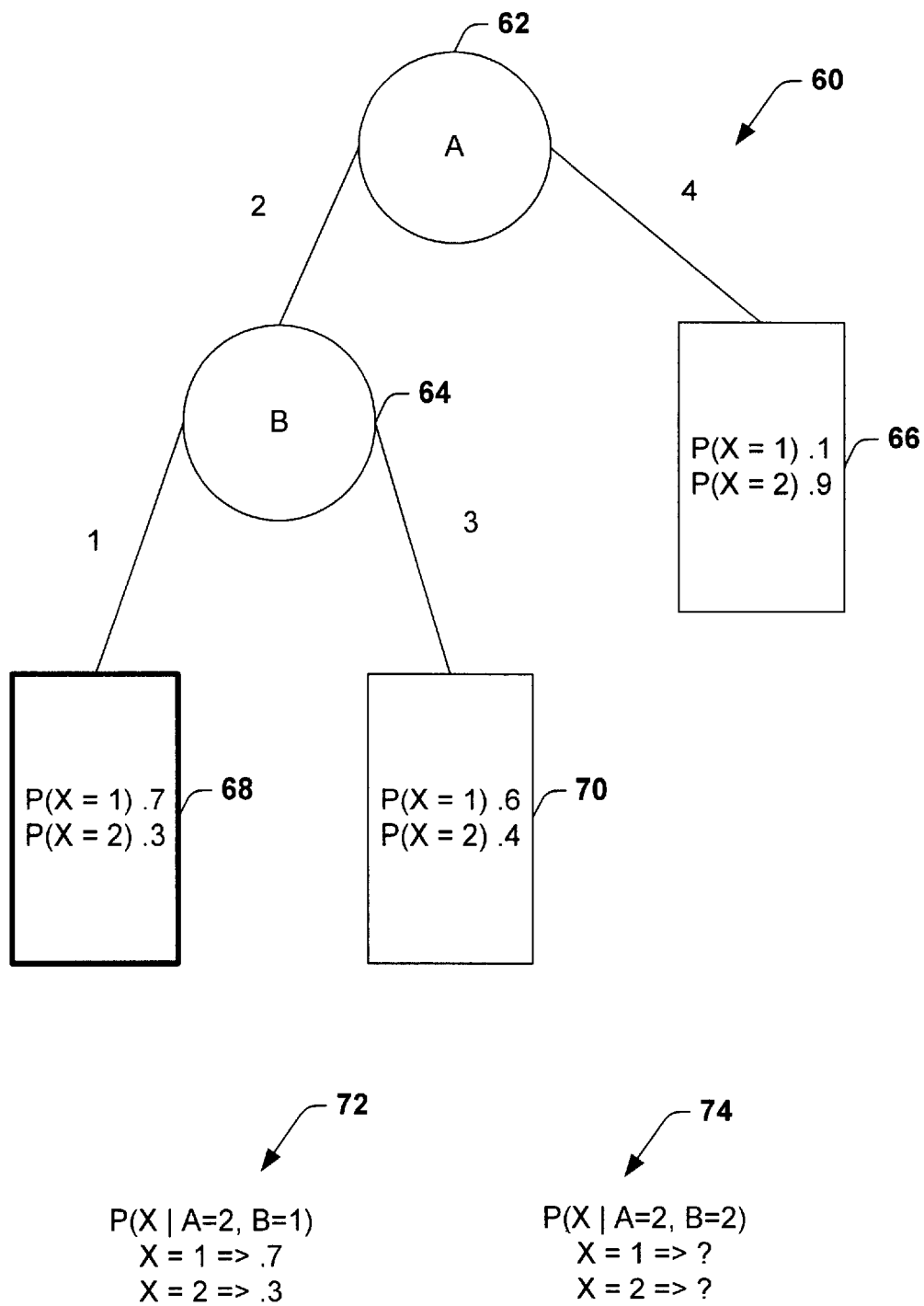
FIG. 2 is a prior art tree diagram illustrating a conventional decision tree.

Similarly, the left child 88 and the right child 90 of split node 84 may contain both probabilities and statistics to determine how probabilities were computed. A query 92 seeks a similar conditional probability as the query 74 (FIG. 2). Unlike the conventional decision tree 60 in FIG. 2, the decision tree 80 may produce an approximate probability based on the additional information stored in the leaf nodes 88 and 90. For example, when the detection component 48 (FIG. 3) determines that the query 92 may not be processed by reading a probability from a leaf node, it may trigger (e.g. set a flag, send a signal, generate an interrupt) the aggregating component 46 (FIG. 3) to perform its aggregating function. The aggregating component 46 may then determine the approximate probability that x will be in state x=1 by, for example, summing occurrences of x=1 for children of the split node 84 and dividing that sum by the sum of all occurrences of x. Similarly the conditional probability that x will be in state x=2 given predictor A=2 and predictor B=2 may be approximated as illustrated by query and computation 94, thereby mitigating the missing predictor problem described above. It is to be appreciated by those skilled in the art that such summing and division is but one example of the functionality of the aggregating component 46 and that other aggregation techniques may be utilized for other probability distributions and trees of different orders.

Figure 5:
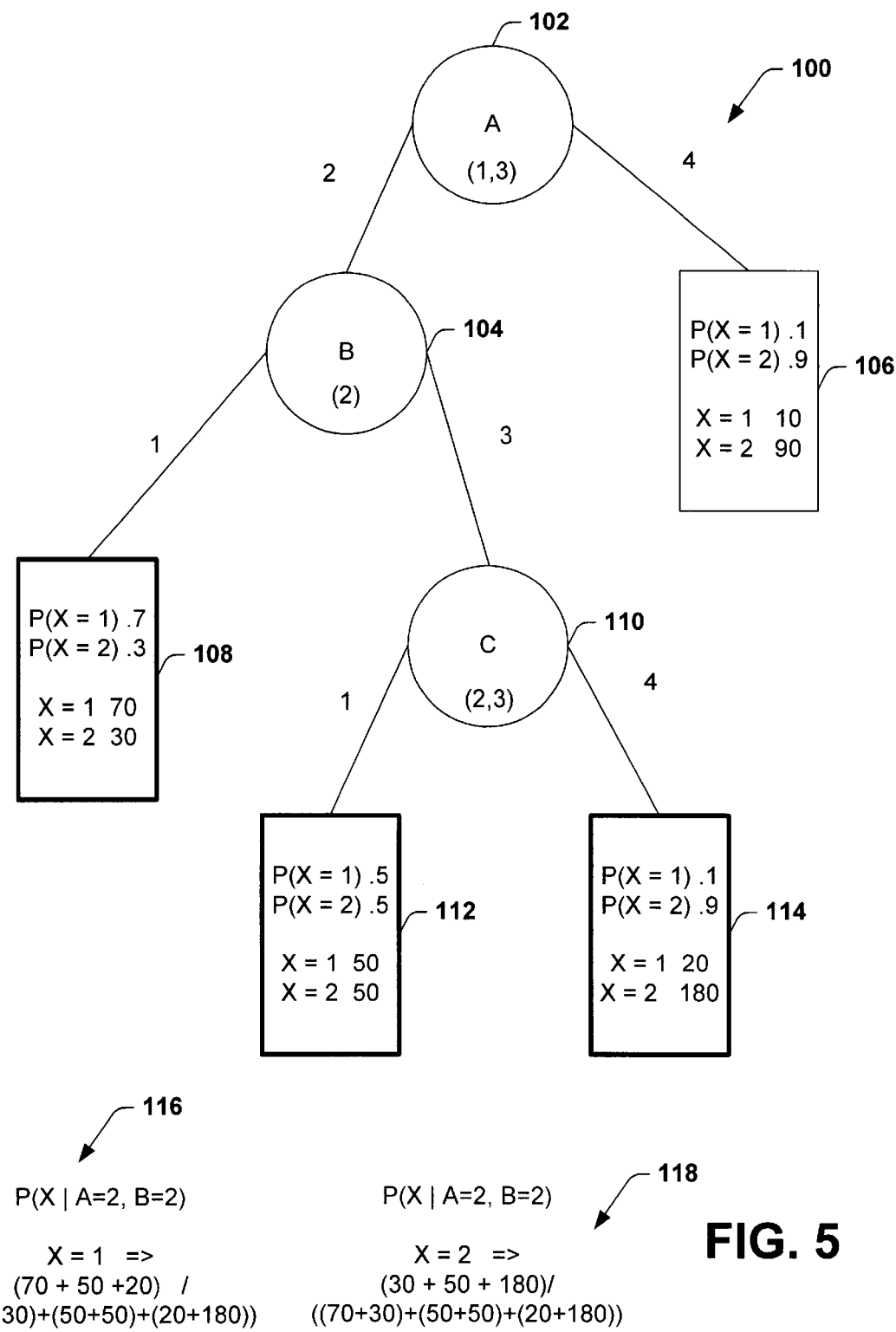
FIG. 5 is a tree diagram illustrating an annotated decision tree and the computation of a conditional probability in a missing predictor situation in accordance with an aspect of the present invention.

FIG. 5 is a tree diagram illustrating a decision tree 100 annotated in accordance with an aspect of the present invention and a computation of a conditional probability triggered by an inadequate training data problem. The decision tree 100 may contain a root node 102 wherein a split was made upon predictor A, with predictor values two and four encountered at least a threshold number of times in the training data, and predictor values one and three not encountered at least a threshold number of times in the training data. Thus, the tracking component 40 produced the list (1,3) associated with the root node 102. Split node 104 may be similarly annotated with a list of predictor values not encountered at least a threshold number of times within RTC(node 104) during training (2) by the tracking component 40. The leaf nodes 106 and 108 may contain both probabilities and statistics for determining how probabilities stored in the leaf nodes 106 and 108 were computed. The split node 110 similarly contains a list of predictor values not encountered at least a threshold number of times (illustrated as bracketed numbers (2,3) in the node 110) within RTC (node 110), wherein the leaf nodes 112 and 114 contain probabilities and statistics. When a query 116 is presented to the decision tree 100, the detecting component 48 determines that the predictor B=2 was not encountered at least a threshold number of times during training by examining the list (2) in node 104 and thus the aggregating component 46 may perform its aggregating function to produce an approximate conditional probability. One such possible aggregation may involve summing the occurrences of x in a certain state and dividing that sum by the sum of all occurrences of x, as illustrated in the computations associated with the query 116. Since the predictor value had inadequate training data at split node 104, nodes reachable from split node 104 (e.g. 108, 112, and 114) may be aggregated by the aggregating component 46 to produce the approximation as illustrated in the computations associated with the query 116. Thus, an approximation for the probability that x is in state 1 may be computed as shown in query 116 and similarly, an approximation for the probability that x is in state 2 may be computed as shown in query 118, for example, thereby mitigating the inadequate training data problem.

Figure 6:
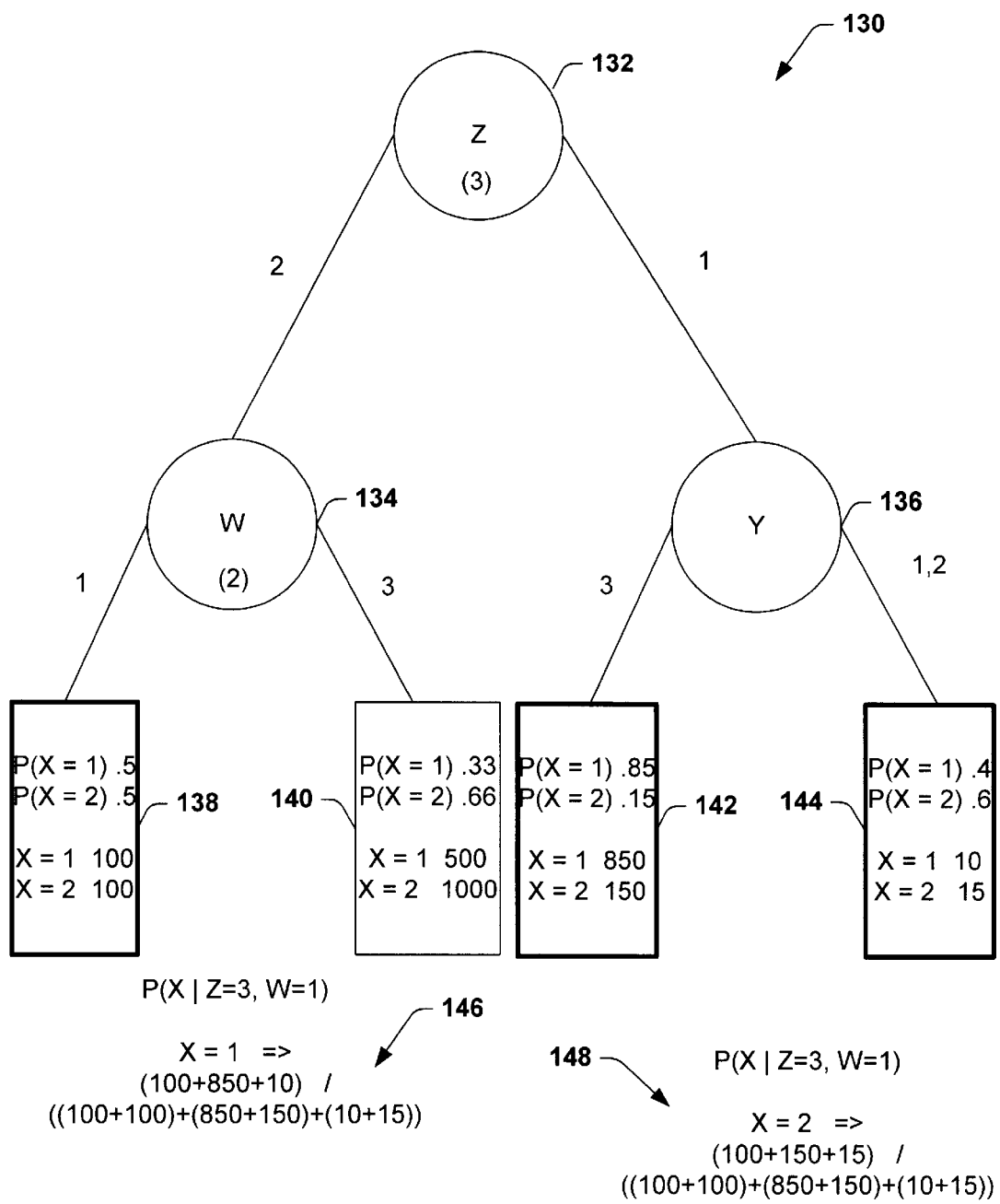
FIG. 6 is a tree diagram illustrating an annotated decision tree and the computation of a conditional probability in a missing predictor situation in accordance with an aspect of the present invention.

FIG. 6 is a tree diagram illustrating a decision tree 130 annotated in accordance with an aspect of the present invention and one exemplary computation of a conditional probability in both a missing predictor and an inadequate data situation utilizing the consistent look-ahead aggregation technique described above. The root node 132 and its immediate descendants 134 and 136 may include a list of predictor values not encountered at least a threshold number of times within RTC(node 134) and RTC(node 136), respectively, during training by the tracking component 40 (FIG. 3). The leaf nodes 138, 140, 142 and 144 contain probabilities that x will be in a certain state and the statistics for computing the probabilities. For example, a query 146 seeks the conditional probability of x given predictor Z=3 and predictor W=1. Since the predictor value Z=3 was not seen during training, using the consistent look-ahead aggregation technique, both the left and right descendants of the root 132 may be traversed by the aggregating component 46 (FIG. 3) when aggregating. But on the left child 134 of the root node 132, information may restrict the aggregation to leaf 138, since the predictor value W=1 was encountered. That is, the leaf node 140, corresponding to W=3, is inconsistent with the known predictor value from the query. Since similar information may be unavailable for the right child 136 (e.g. no predictor for Y), both leaves 142 and 144 may be aggregated. Thus, an approximate probability for x given Z=3 and W=1 may be generated further mitigating missing predictor problems.

Figure 7:
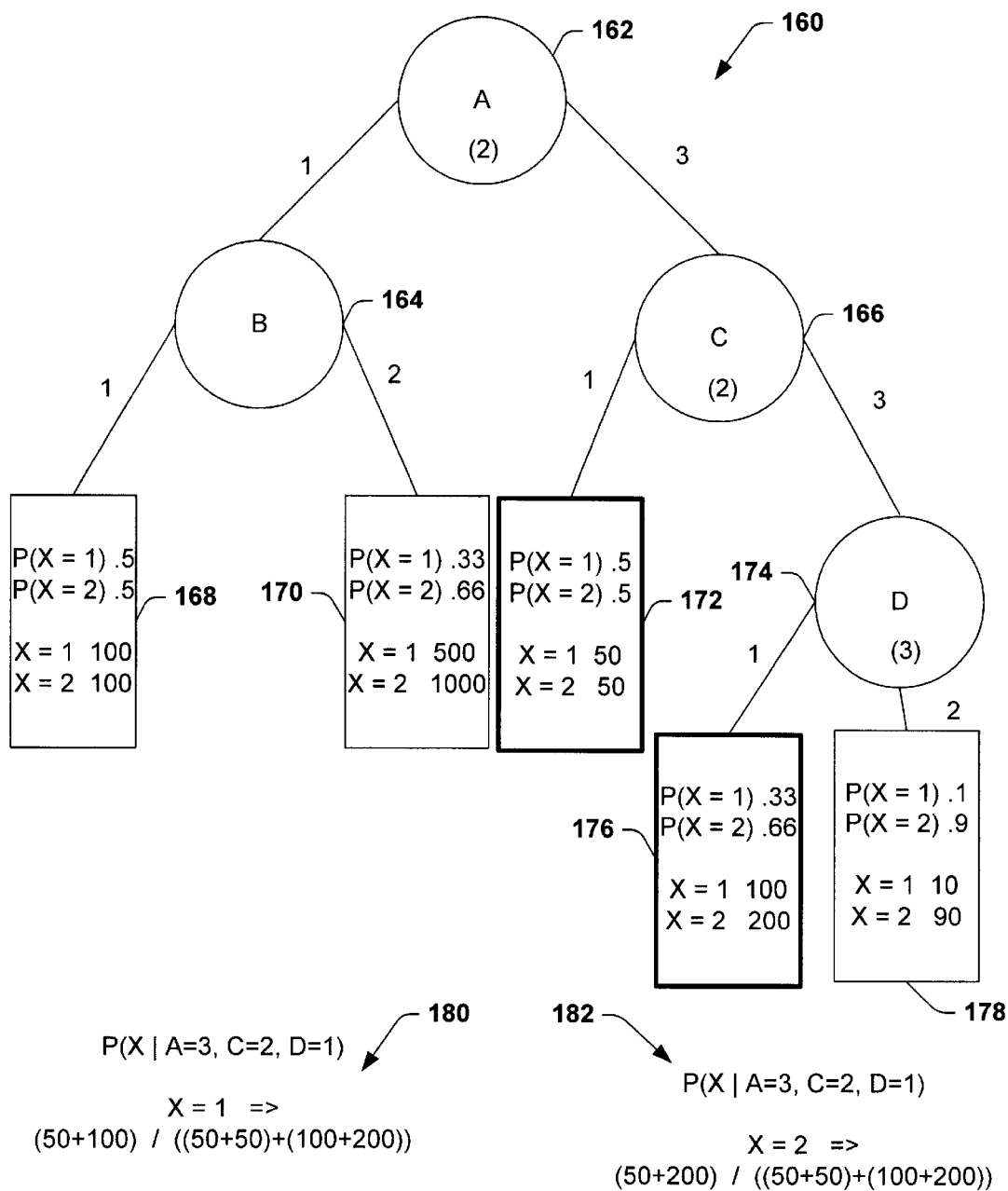
FIG. 7 is a tree diagram illustrating an annotated decision tree and the computation of a conditional probability in a missing predictor situation utilizing the consistent look-ahead aggregation method in accordance with an aspect of the present invention.

FIG. 7 is a tree diagram illustrating a decision tree 160 annotated in accordance with an aspect of the present invention and the computation of a conditional probability in a missing predictor situation utilizing an aggregation technique. The root node 162 and its descendant split nodes 164, 166, and 174 have been annotated similarly to the trees described above. Similarly, the leaf nodes 168, 170, 172, 176 and 178 have been annotated with the statistics for computing the stored probabilities. A query 180 seeks the conditional probability that x is in a certain state given that predictor A=3, predictor C=2 and predictor D=1. At the root node 162 there is a path for A=3, so the right side of root node 162 may be analyzed. But at split node 166, inadequate instances where C=2 were encountered within RTC(node 166) during training and thus both sides of split 166 will be analyzed. Looking ahead at split node 174 reveals that there were occurrences for predictor D=1, and thus, using the consistent look-ahead aggregation method, the left child 176 of split 174 will be analyzed. Thus, the approximation for the conditional probability sought in the query 180 may be computed by aggregating the statistics in leaf nodes 172 and 176, as illustrated in the computations accompanying queries 180 and 182.

Figure 8:
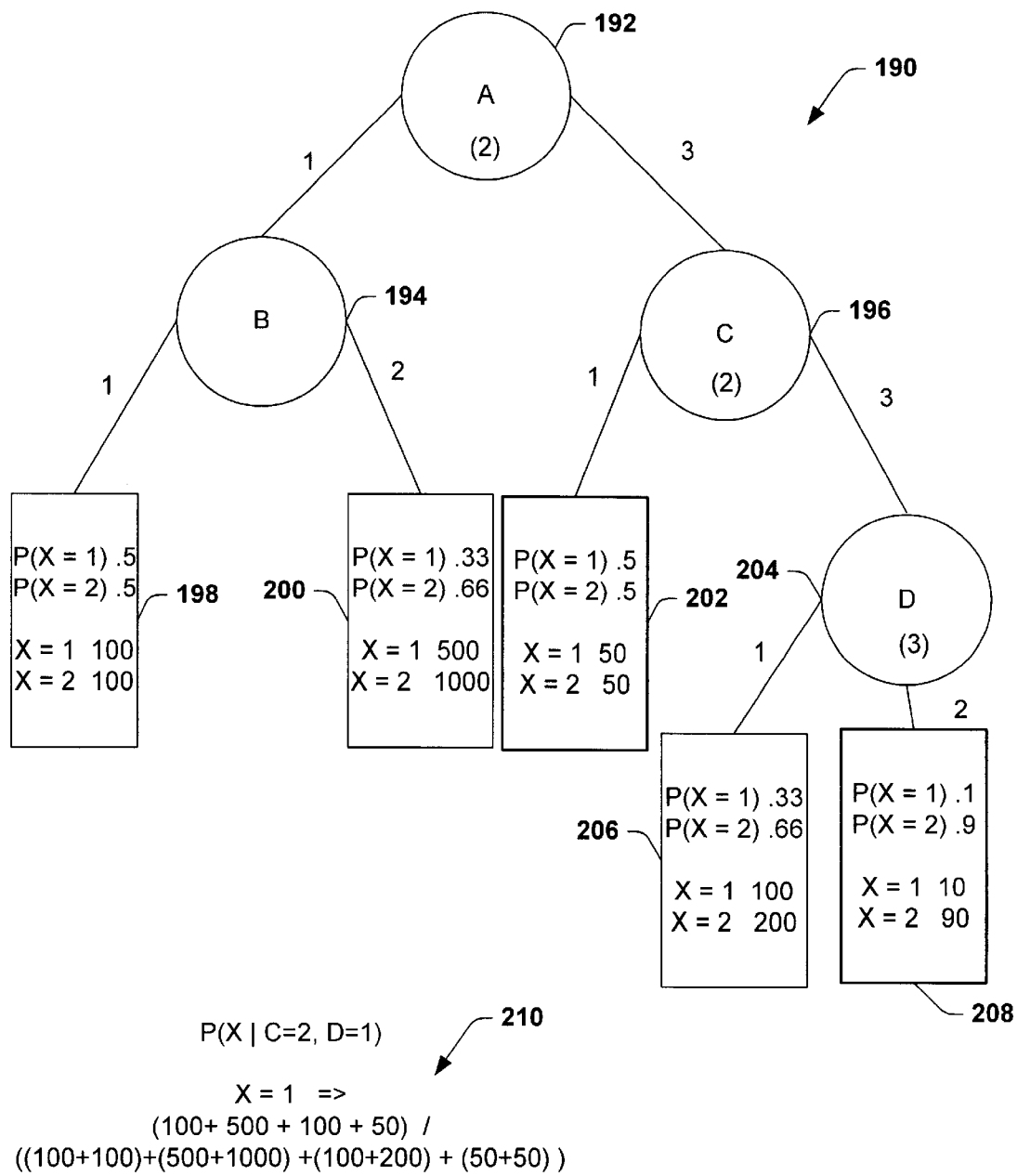
FIG. 8 is a tree diagram illustrating an annotated decision tree and the computation of a conditional probability in both a inadequate training data and a missing predictor situation utilizing the look-ahead method in accordance with an aspect of the present invention.

FIG. 8 is a tree diagram illustrating a decision tree 190 annotated in accordance with an aspect of the present invention and the computation of a conditional probability in both an inadequate training data and a missing predictor situation utilizing the consistent look-ahead aggregation technique. The root node 192 and its descendant split nodes 194, 196 and 204 have been annotated similarly to the trees described above in accordance with the present invention. Similarly, the leaf nodes 198, 200, 202, 206 and 208 have been annotated with statistics for computing the probabilities stored for the leaf nodes, in accordance with the present invention. A query 210 presents the decision tree with a missing predictor problem and an inadequate training data problem as described above. The query 210 seeks the conditional probability of x given predictor C=2 and predictor D=1, but the query may contain assignments for predictors A and B. Conventionally, a decision tree may not yield an accurate conditional probability in response to this query because no predictor value for A was provided. But the present invention provides aggregation techniques for mitigating these problems.

The consistent look-ahead aggregation method handles these problems as follows. By way of illustration, since no predictor value is provided for the split on the node 192, the split attribute being A, both paths from the root node 192 may be examined. On the left side of the root node 192, again there is a missing predictor problem, since no predictor value is provided for the split on node 194, the split attribute being B. Thus both leaf nodes 198 and 200 below node 194 will be included in the aggregation. On the right side of the root node 192, there is a predictor value provided for the split on the attribute C at node 196. But the predictor value provided triggers an inadequate training data problem since the provided predictor value is in the list of predictor values for which inadequate training data was provided. Consequently, the leaf node 202 will be included in the aggregation. Because the consistent look-ahead aggregation method is being used, and the value of D is 1, the leaf node 206 is included in the aggregation and the leaf node 208 is excluded from the aggregation. It is to be appreciated by those skilled in the art that the consistent look-ahead aggregation technique is but one possible look-ahead aggregation technique and that other such techniques may be utilized for other trees and other probability distributions.

Figure 9:
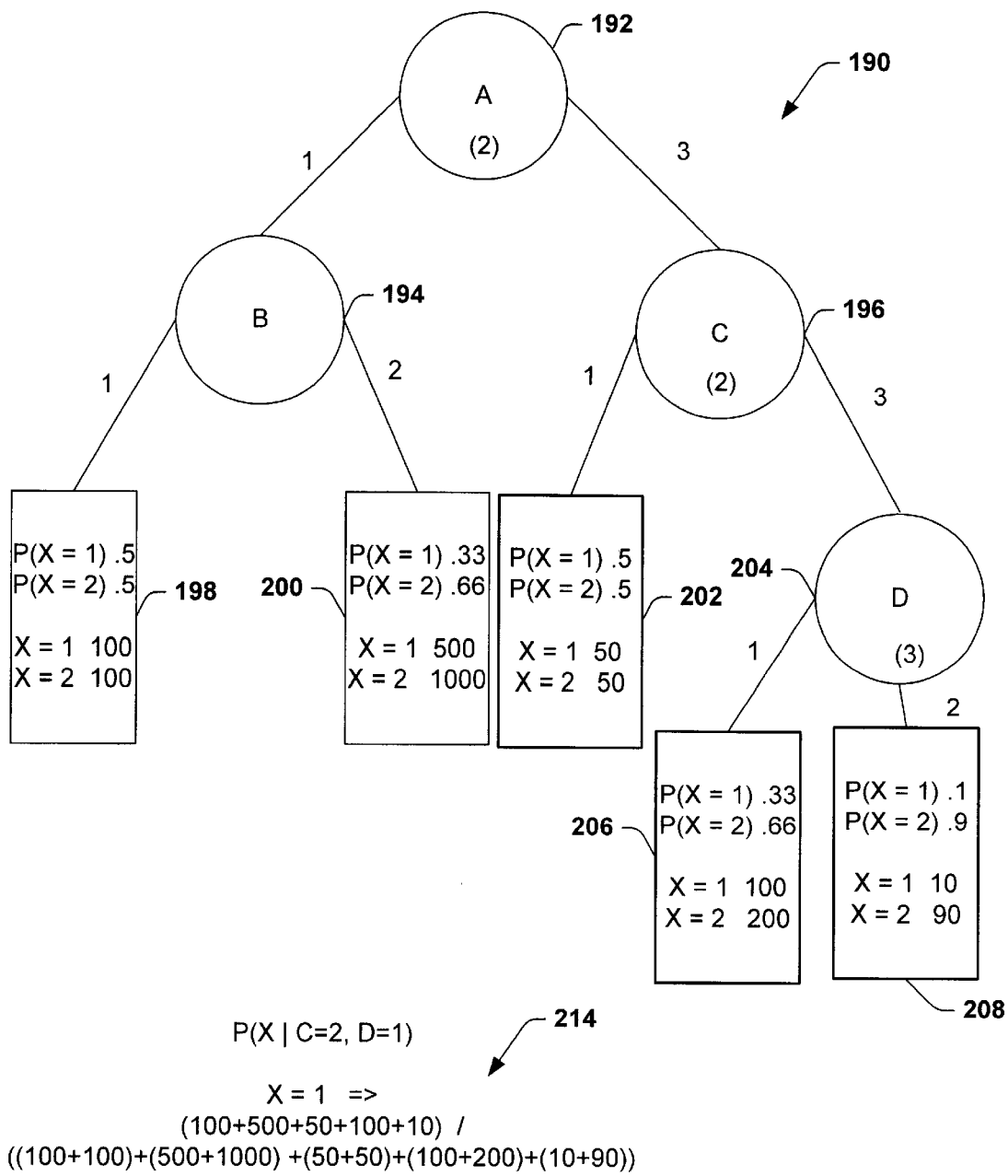
FIG. 9 is a tree diagram illustrating an annotated decision tree and the computation of a conditional probability in an inadequate training data situation without utilizing a look-ahead method in accordance with an aspect of the present invention.

FIG. 9 is a tree diagram illustrating the annotated tree 190 of FIG. 8 and an alternative method for computing a conditional probability in an inadequate training data situation that does not utilize the consistent look-ahead aggregation method, but rather an alternative aggregation method, the simple aggregation method. In FIG. 9, the simple aggregation technique is employed for query 214 and thus the statistics from leaf nodes 198, 200, 202, 204, 206 and 208 are aggregated, despite the fact that node 208 is inconsistent with the assignment D=1 from the query, and despite the fact that node 202 is inconsistent with the assignment C=2 from the query, using the method as illustrated in the computations associated with query 214. Thus FIGS. 8 and 9 illustrate alternative aggregation techniques that mitigate the inadequate training data problem described above.

Figure 10:
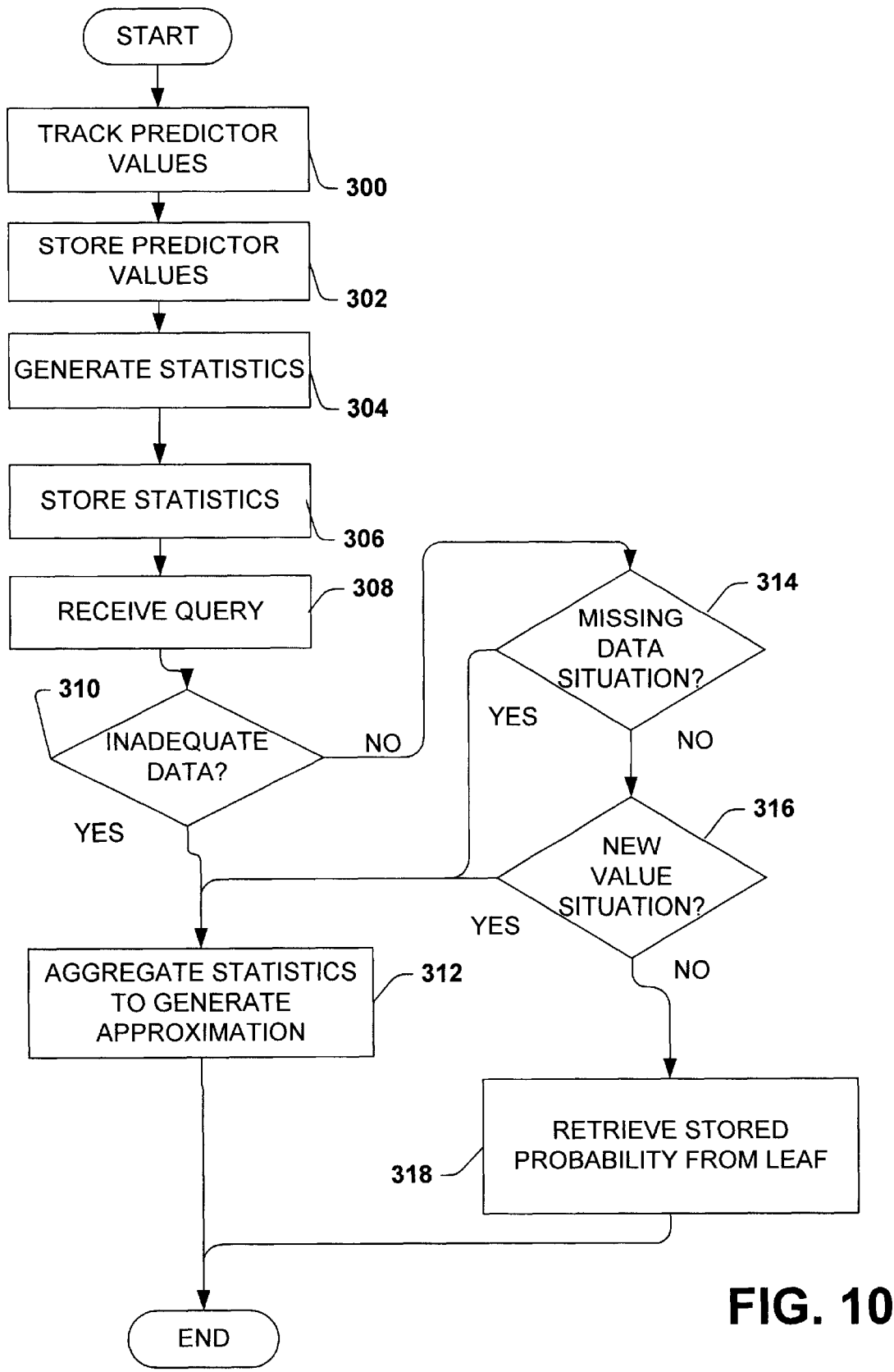
FIG. 10 is a flow chart illustrating a method for extracting predictions from a decision tree in accordance with an aspect of the present invention.

FIG. 10 is a flow chart illustrating a method for extracting predictions from a decision tree. At step 300, predictor values are tracked to determine which predictor values for split nodes were encountered. Tracking the predictor values facilitates triggering an aggregation technique used to approximate a conditional probability. At step 302, the predictor values tracked at step 300 are stored to facilitate triggering aggregation. At step 304, statistics for computing probabilities are generated. It is to be appreciated by one skilled in the art that different statistics may be generated for a plurality of tree orders and aggregation techniques. The statistics may be utilized in the aggregation technique to approximate a conditional probability, thus mitigating the missing predictor, inadequate training data and new value problems described above. At step 306, the statistics generated at step 304 are stored to facilitate aggregation. At step 308 a query to retrieve a conditional probability is received. At step 310 a determination is made concerning whether the query will produce a missing predictor situation. For example, supplied predictor values may be compared to split values and known missing predictor values. If the determination at step 310 is YES, then at step 312 an approximate conditional probability may be generated utilizing an aggregation technique that accesses the statistics stored at step 306. If the determination at step 310 is NO, then at step 314 a determination may be made concerning whether the query received at step 308 generates an inadequate training data situation. For example, supplied predictor values may be compared to split values and known missing predictor values. If the determination at step 314 is YES, then at step 312 an approximate conditional probability may be generated utilizing an aggregation technique accessing the statistics stored at step 306. If the determination at step 314 is NO then at step 316, a determination is made concerning whether the query received at step 308 generates a new value situation. If the determination at step 314 is YES, then at step 312 an approximate conditional probability may be generated utilizing an aggregation technique accessing the statistics stored at step 306. If the determination at step 316 is YES, then at step 312 an approximate conditional probability may be generated utilizing an aggregation technique accessing the statistics stored at step 306. If the determination at step 316 is NO, that at step 3 18 the requested probability may be retrieved from a leaf in a decision tree.

FIG. 11 is a segment of pseudocode 400 for one exemplary recursive implementation of the consistent look-ahead aggregation algorithm utilized to retrieve statistics for producing an approximate conditional probability. It is to be understood by one skilled in the art that the algorithm described in FIG. 11 is but one possible method for traversing a decision tree and returning the stored statistics and thus the described method is not intended to limit the present invention.

Figure 12:
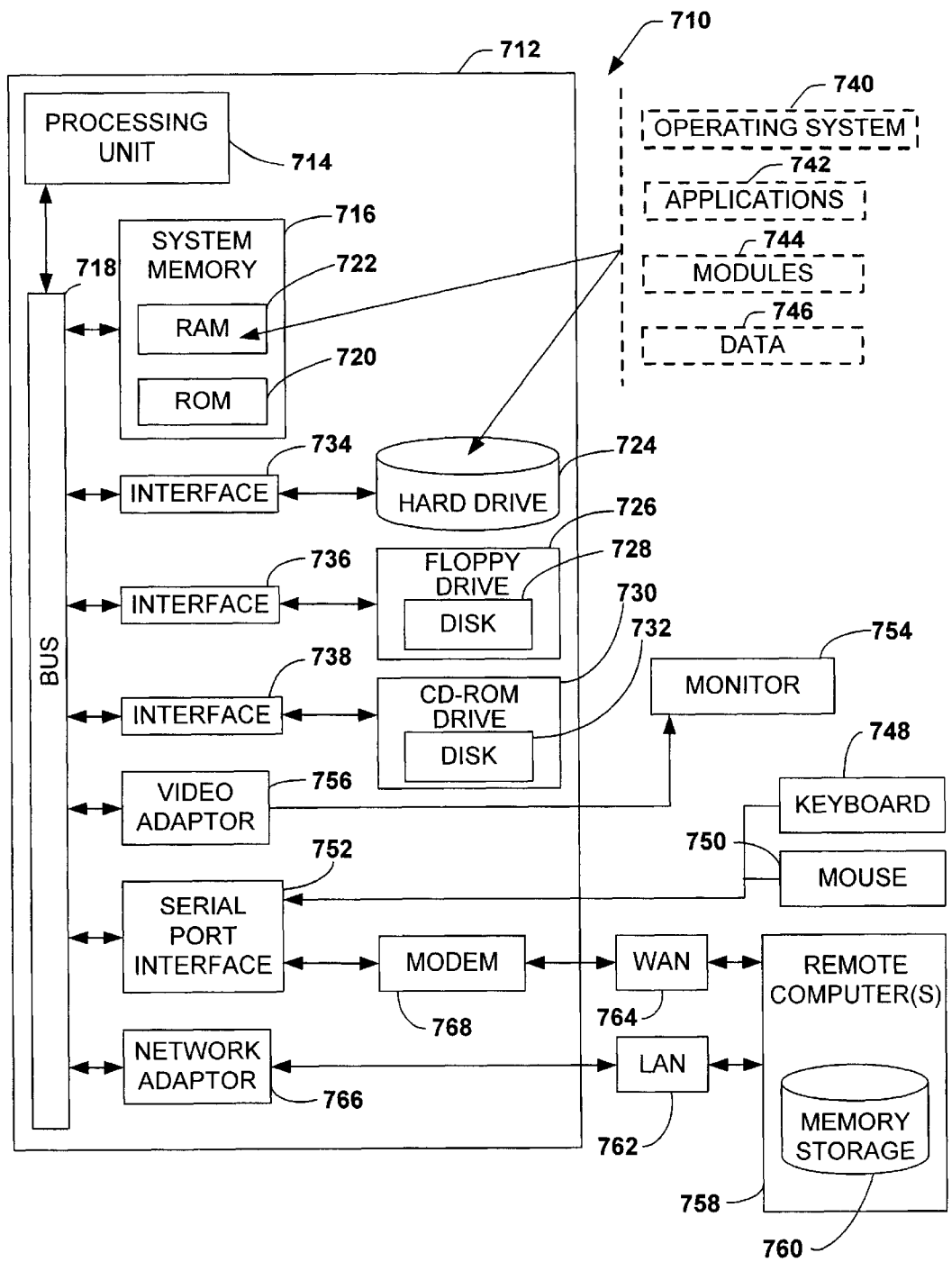
FIG. 12 is a schematic block diagram of an exemplary operating environment for a system configured in accordance with the present invention.

With reference to FIG. 12, an exemplary environment 710 for implementing various aspects of the invention includes a computer 712, including a processing unit 714, a system memory 716, and a system bus 718 that couples various system components including the system memory to the processing unit 714. The processing unit 714 may be any of various commercially available processors. Dual microprocessors and other multi-processor architectures also can be used as the processing unit 714.

The system bus 718 may be any of several types of bus structure including a memory bus or memory controller, a peripheral bus, and a local bus using any of a variety of commercially available bus architectures. The computer 712 memory includes read only memory (ROM) 720 and random access memory (RAM) 722. A basic input/output system (BIOS), containing the basic routines that help to transfer information between elements within the computer 712, such as during start-up, is stored in ROM 720.

The computer 712 further includes a hard disk drive 724, a magnetic disk drive 726, e.g., to read from or write to a removable disk 728, and an optical disk drive 730, e.g., for reading a CD-ROM disk 732 or to read from or write to other optical media. The hard disk drive 724, magnetic disk drive 726, and optical disk drive 730 are connected to the system bus 718 by a hard disk drive interface 734, a magnetic disk drive interface 736, and an optical drive interface 738, respectively. The drives and their associated computer-readable media provide nonvolatile storage of data, data structures, computer-executable instructions, etc. for the computer 712, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 722, including an operating system 740, one or more application programs 742, other program modules 744, and program data 746. The operating system 740 can be any of a variety of commercially available operating systems.

A user may enter commands and information into the computer 712 through a keyboard 748 and a pointing device, such as a mouse 750. Other input devices (not shown) may include a microphone, an IR remote control, a joystick, a game pad, a satellite dish, a scanner, or the like. These and other input devices are often connected to the processing unit 714 through a serial port interface 752 that is coupled to the system bus 718, but may be connected by other interfaces, such as a parallel port, a game port, a universal serial bus ("USB"), an IR interface, etc. A monitor 754 or other type of display device is also connected to the system bus 718 via an interface, such as a video adapter 756. In addition to the monitor, a computer typically includes other peripheral output devices (not shown), such as speakers, printers etc.

The computer 712 may operate in a networked environment using logical connections to one or more remote computers, such as a remote computer(s) 758. The remote computer(s) 758 may be a workstation, a server computer, a router, a personal computer, microprocessor based entertainment appliance (e.g., a WebTV® client system), a peer device or other common network node, and typically includes many or all of the elements described relative to the computer 712, although, for purposes of brevity, only a memory storage device 760 is illustrated. The logical connections depicted include a local area network (LAN) 762 and a wide area network (WAN) 764. Such networking environments are commonplace in offices, enterprise-wide computer networks, intranets and the Internet.

When used in a LAN networking environment, the computer 712 is connected to the local network 762 through a network interface or adapter 766. When used in a WAN networking environment, the computer 712 typically includes a modem 768, or is connected to a communications server on the LAN, or has other means for establishing communications over the WAN 764, such as the Internet. The modem 768, which may be internal or external, is connected to the system bus 718 via the serial port interface 752. In a networked environment, program modules depicted relative to the computer 712, or portions thereof, may be stored in the remote memory storage device 760. It will be appreciated that the network connections shown are exemplary and other means of establishing a communications link between the computers may be used.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as that term is interpreted when employed as a transitional word in a claim.

What is claimed is:

1. A computerize system for extracting predictions from a decision tree, comprising:
    a first component that tracks, for one or more split nodes in the decision tree, one or more predictor values that did not appear in at least k records in relevant training cases for the split node, k being an integer;
    a second component that stores, for one or more predictor attributes, a set of known values for the one or more predictor attributes;
    a third component that detects, during a traversal of the decision tree, that a predictor attribute corresponding to a split in the decision tree has not been assigned a value in a query; and
    a fourth component that stores in a leaf node of the decision tree statistics for deriving a non-leaf probability corresponding to the one or more predictor values.

2. The system of claim 1, further comprising:
    a fifth component that aggregates statistics from at least a subset of all leaf nodes that are descendants of a split node to approximate probabilities, when a given predictor value is at least one of the following: missing, in a state that did not appear in at least k records, k being an integer, in the relevant training data for the split node and, a new value.

3. The system of claim 2 wherein the fifth component aggregates statistics from the subset consisting of all nodes descending from a split node.

4. The system of claim 2 wherein the fifth component utilizes the consistent look-ahead method to determine the subset of descendant leaf nodes from which statistics are aggregated.

5. The system of claim 2, further comprising:
    a sixth component that detects when the fifth component approximates a probability.

6. The system of claim 2 wherein the statistics are stored in one or more nodes in the decision tree.

7. The system of claim 1, wherein the tracking component stores the one or more predictor values that did not appear at least k times in the relevant training cases in one or more nodes in the decision tree.

8. The system of claim 5, wherein if the sixth component identifies a missing predictor problem, the aggregating function of the fifth component is initiated.

9. The system of claim 5, wherein if the sixth component identifies an inadequate training data problem, the aggregating function of the fifth component is initiated.

10. The system of claim 5, wherein if the sixth component identifies a new value problem, the aggregating function of the fifth component is initiated.

11. A computerize method for extracting predictions from a decision tree, comprising:
    identifying for one or more split nodes, a plurality of predictor values that did not appear in at least k records in relevant training data for the split node;
    identifying one or more known values for one or more predictor attributes; and
    detecting, during a traversal of a decision tree, a situation where a predictor attribute corresponding to a split has not been assigned a value in a query.

12. The method of claim 11, further comprising:
    generating one or more statistics for deriving one or more non-leaf probabilities corresponding to one or more predictor values.

13. The method of claim 12, further comprising:

storing within one or more split nodes the one or more statistics for deriving non-leaf probabilities corresponding to the one or more predictor; and aggregating the statistics to approximate a probability.

14. The method of claim 13, further comprising:

detecting when an aggregating method approximates the probability.

15. The method of claim 14, further comprising:

aggregating statistics of at least a subset of descendant leaf nodes of a split node when a predictor value corresponding to the split node is missing.

16. The method of claim 14, further comprising:

aggregating statistics of at least a subset of descendant leaf nodes of a split node when a predictor value corresponding to the split node is in a state that did not appear at least k times in the relevant training cases for the split node, k being an integer.

17. The method of claim 14, further comprising:

aggregating statistics of at least a subset of descendant leaf nodes of a split node when a predictor value corresponding to the split node generates a new value situation.

18. The method of claim 15, wherein the aggregating method includes a consistent look-ahead method for determining one or more nodes from which to gather one or more sets of statistics to be aggregated.

19. The method of claim 16, wherein the aggregating method includes a consistent look-ahead method for determining one or More nodes from which to gather one or more sets of statistics to be aggregated.

20. The method of claim 15, wherein the aggregating method collects one or more sets of statistics from all descendent nodes of a split node associated with a missing predictor value problem.

21. The method of claim 16, the aggregating method including a consistent look-ahead method for determining one or more nodes from which to gather one or more sets of statistics to be aggregated.

22. The method of claim 16, wherein the aggregating method collects one or more sets of statistics from all descendent nodes of a split node associated with an inadequate training data problem.

23. The method of claim 17, the aggregating method including a consistent look-ahead method for determining one or more nodes from which to gather one or more sets of statistics to be aggregated.

24. The method of claim 17, wherein the aggregating method collects one or more sets of statistics from all descendent nodes of a split node associated with a new value problem.

25. A computerize system for extracting predictions from a decision tree, comprising:

means for tracking one or more predictor values not occurring at least k times in the relevant training cases, k being an integer;

means for storing the plurality of predictor values that did not occur at least k times in the relevant training cases, k being an integer, means for collecting, for one or more predictor attributes, a set of known values for the one or more predictor attributes; and means for recognizing a predictor value corresponding to a split that has not been assigned a value in a query.

26. The system of claim 25, further comprising:

means for generating statistics for deriving one or more non-leaf probabilities corresponding to one or more predictor values.

27. The system of claim 26, further comprising:

means for storing statistics for deriving one or more non-leaf probabilities corresponding to the one or more predictor values; and means for aggregating statistics to approximate a probability.

28. The system of claim 27, further comprising:

means for detecting when aggregating means approximate the probability.

29. The system of claim 28, further comprising:

means for aggregating statistics of at least a subset of descendant leaf nodes of a split node when a predictor value corresponding to the split node is missing.

30. The system of claim 28, further comprising:

means for aggregating statistics of at least a subset of descendant leaf nodes of a split node when a predictor value corresponding to the split node is in a state that did not appear at least k times in the relevant training cases for the split node, k being an integer.

31. The system of claim 28, further comprising:

means for aggregating statistics of at least a subset of descendant leaf nodes of a split node when a predictor value corresponding to the split node generates a new value problem.

* * * * *